US007899731B2

(12) United States Patent
Sreevijayan et al.

(10) Patent No.: US 7,899,731 B2
(45) Date of Patent: *Mar. 1, 2011

(54) MORTGAGE-BACKED SECURITY HEDGING SYSTEMS AND METHODS

(75) Inventors: Devakumar Sreevijayan, Marlboro, NJ (US); Andrew K. Gunstensen, Princeton, NJ (US)

(73) Assignee: Morgan Stanley, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/783,898

(22) Filed: May 20, 2010

(65) Prior Publication Data

US 2010/0228663 A1    Sep. 9, 2010

Related U.S. Application Data

(63) Continuation of application No. 11/140,819, filed on May 31, 2005, now Pat. No. 7,747,501.

(51) Int. Cl.
*G06Q 40/00* (2006.01)

(52) U.S. Cl. ...................... 705/36 R; 705/35

(58) Field of Classification Search ............... 705/36 R, 705/37, 35
See application file for complete search history.

(56) References Cited

U.S. PATENT DOCUMENTS

| 7,236,952 | B1 * | 6/2007 | D'Zmura | 705/36 R |
| 2003/0055664 | A1 * | 3/2003 | Suri | 705/1 |
| 2003/0065609 | A1 * | 4/2003 | Oh | 705/37 |
| 2003/0074306 | A1 * | 4/2003 | Rios et al. | 705/38 |
| 2003/0105696 | A1 | 6/2003 | Kalotay et al. | |
| 2003/0187777 | A1 * | 10/2003 | Kochansky et al. | 705/37 |
| 2004/0059646 | A1 * | 3/2004 | Harrington et al. | 705/27 |
| 2004/0158515 | A1 * | 8/2004 | Schoen | 705/35 |
| 2005/0060254 | A1 * | 3/2005 | Jones | 705/36 |
| 2005/0075962 | A1 * | 4/2005 | Dunne | 705/36 |
| 2005/0080704 | A1 * | 4/2005 | Erlach et al. | 705/36 |
| 2005/0131787 | A1 * | 6/2005 | Monteleone et al. | 705/35 |
| 2005/0171893 | A1 * | 8/2005 | Gaer | 705/37 |

* cited by examiner

*Primary Examiner*—Jagdish N Patel
*Assistant Examiner*—Kevin Poe
(74) *Attorney, Agent, or Firm*—K&L Gates LLP

(57) ABSTRACT

A computer assisted method of developing a hedge position for a mortgage-backed security. The method includes calculating a duration of the security based on price histories of the security and changes in yield of a benchmark security and expressing periodic changes in price of the security. The method also includes calculating a relative coupon of the security and calculating a current coupon yield of the mortgage sector. The method further includes calculating an empirical duration of the security, calculating a hedge ratio for the security, and outputting a hedge position for the security based on the hedge ratio.

17 Claims, 2 Drawing Sheets

MORTGAGE-BACKED SECURITY HEDGING SYSTEMS AND METHODS

PRIORITY CLAIM

The present application is a continuation of U.S. patent application Ser. No. 11/140,819, filed May 31, 2005, which is incorporated herein by reference.

BACKGROUND

Various financial service entities and investors buy and sell securities, such as mortgage passthrus, at all times of the trading day and in large quantities and often accumulate large positions in these instruments, either long or short. To counteract adverse price movements, it is often desirable to hedge the positions effectively by the simultaneous purchase or sale of other instruments, for example Treasury bills. An element in formulating a hedging strategy is to determine how much the price of each instrument changes as the yield curve changes. This is referred to herein as the "duration." Knowing the duration of both the mortgage passthru and the Treasury bill, a trader can determine how much Treasuries to buy or sell to offset the risk of the mortgage position up to the first order. Therefore, a proper estimation of mortgage duration in real-time is often desirable to market-making activity.

However, in the case of mortgage passthrus, determination of duration is not only complicated by the fact that it depends on the inherent optionality of the passthru—mortgage holders have the option to prepay their mortgage at any time—and the degree to which the option is in or out of the money, but also that this optionality changes dynamically as mortgage rates change during the day, sometimes dramatically so. A mortgage passthru is said to be "in-the-money" if its coupon exceeds the prevailing mortgage rate and vice versa. The prevailing mortgage rate is determined in the secondary mortgage market based on the real-time prices of mortgage passthrus across different coupons. This is referred to as the current (or par) coupon rate. The more in-the-money a mortgage passthru is, the shorter its duration and the more out-of-the-money it is, the longer its duration. Because the current coupon changes dynamically, so does the optionality of the passthru and thus its duration.

Several methods exist to determine the duration of a mortgage. Most are model based, where market participants typically derive statistical models of mortgage prepayment behavior and thus determine price changes as rates change. However, despite the care and effort that goes into modeling these, there is wide variability in the outputs of these models, and because their overall consensus is likely reflected in the traded prices, there is a need for deriving the mortgage duration empirically from actual prices and observed rate changes. There is also a need for determination of empirical durations of mortgage passthrus in real-time for the dynamic hedging of large and heterogeneous mortgage passthru positions.

SUMMARY

In various embodiments, the present invention is directed to a computer assisted method of developing a hedge position for a mortgage-backed security. The method includes calculating a duration of the security based on price histories of the security and changes in yield of a benchmark security and expressing periodic changes in price of the security. The method also includes calculating a relative coupon of the security and calculating a current coupon yield of the mortgage sector. The method further includes calculating an empirical duration of the security, calculating a hedge ratio for the security, and outputting a hedge position for the security based on the hedge ratio.

In various embodiments, the present invention is directed to a system for developing a hedge position for a mortgage-backed security. The system includes a data network and a theoretical price engine in communication with the data network. The system also includes a market data price server in communication with the data network for computing a bid/ask broker price from at least one broker price feed and a hedge ratio server in communication with the data network for computing a hedge ratio and for outputting a hedge position based on the hedge ratio to at least one application.

In various embodiments, the present invention is directed to an apparatus. The apparatus includes means for calculating a duration of a mortgage-backed security based on price histories of the security and changes in yield of a benchmark security and means for expressing periodic changes in price of the security. The apparatus also includes means for calculating a relative coupon of the security and means for calculating a current coupon yield of the mortgage sector. The apparatus further includes means for calculating an empirical duration of the security, means for calculating a hedge ratio for the security, and means for outputting a hedge position for the security based on the hedge ratio.

In various embodiments, the present invention is directed to a computer readable medium having stored thereon instructions which, when executed by a processor, cause the processor to:

calculate a duration of a mortgage-backed security based on price histories of the security and changes in yield of a benchmark security;

express periodic changes in price of the security;

calculate a relative coupon of the security;

calculate a current coupon yield of the mortgage sector;

calculate an empirical duration of the security;

calculate a hedge ratio for the security; and output a hedge position for the security based on the hedge ratio.

In another general aspect, the present invention is directed to computer assisted methods and computer systems of computing hedge ratios for one or more hedge instruments to hedge a portfolio of mortgage-backed securities belonging to a mortgage sector. The mortgage sector has multiple different coupons in a coupon stack. The method may comprise the steps of: (i) calculating, by a computer system, a vector of relative coupon durations for the coupons in the coupon stack based on a system of equations that relates a vector of price changes across the coupons in the coupon stack, a change in a benchmark interest rate, a matrix of relative coupon weights, and the vector of relative coupon durations; (ii) calculating, by the computer system, real-time relative coupons for the coupon stack based on a real-time current coupon yield for the mortgage sector; (iii) calculating, by the computer system, real-time relative coupon weights for the coupons based on the calculated real-time relative coupons; (iv) calculating, by the computer system, real-time dollar durations for the coupons in the coupon stack based on a product of the real-time relative coupon weights and the vector of relative coupon durations; and (v) calculating, by the computer system, the hedge ratios for the one or more hedge instruments based on the real-time dollar durations for the coupons.

DESCRIPTION

Various embodiments of the present invention may be employed to compute, for example in real time, an equivalent hedge position for a complex portfolio of, for example, mortgage backed securities (e.g., mortgage passthrus). As used herein, "hedge position" is defined as the notional amounts of a chosen set of hedge instruments required to neutralize the market exposure of a trading portfolio. As used herein, a "mortgage passthru" is defined as a security that consists of a pool of mortgage (e.g., residential mortgage) loans.

Figure 1:
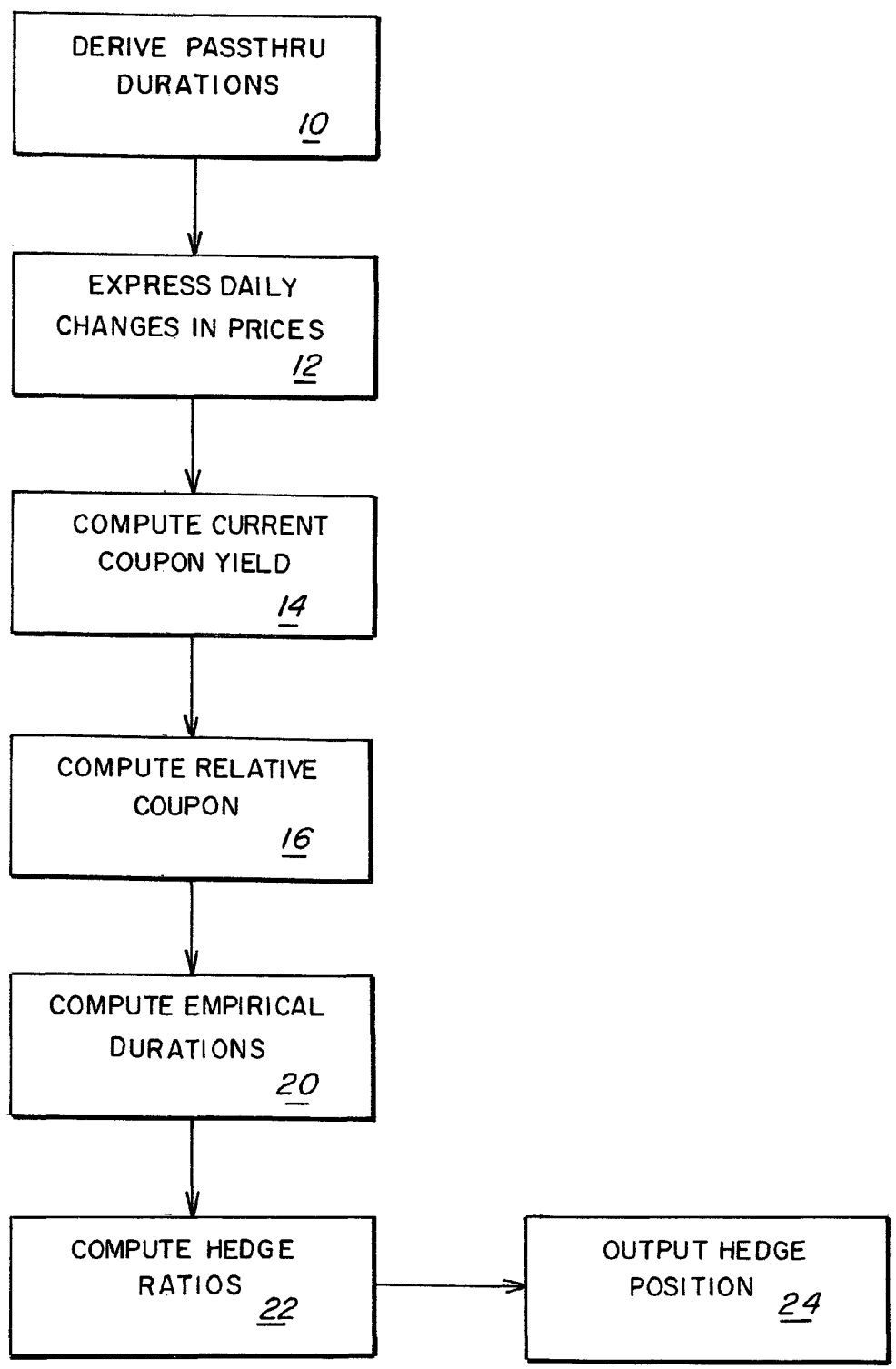
FIG. 1 illustrates an embodiment of a process for determining a hedge position for a security.

FIG. 1 illustrates an embodiment of a process for determining a hedge position for a security. At step 10, the duration of the security (e.g., a mortgage passthru) is computed. The durations of mortgage passthrus (herein referred to as "mortgages" or "passthrus") change accordingly as their optionality changes, but mortgages of constant optionality have constant durations. This is a reasonable assumption to make, at least for periods of time where the slope of the yield curve remains relatively unchanged, etc. At step 12, the prices of mortgages in terms of the prices of mortgages of constant relative coupon (i.e., relative with respect to the current coupon) are expressed. Furthermore, because mortgage passthru trades settle once a month on specified dates, and because market liquidity for passthrus that settle on any particular month changes as a settlement date is approached, to maintain a uniform liquidity picture it may be desirable to work with forward-settling mortgages of a constant horizon. Thus the change in price on any given day of mortgage passthrus across the coupon stack (e.g., from a coupon of 4.5 at the low end to 7.5 at the high-end) and settling a constant 45-days forward in time is derived. These price changes are expressed in terms of relative coupon, at fixed relative coupon intervals, at, for example, intervals of 50 basis points (bp). The example below illustrates this concept.

Let $p_{5.0}^{T1}(t)$ be the price of a 5.0 coupon mortgage passthru settling in the current settle month T1 at time t. Let $r_{cc}(t)$ be the current coupon yield for the relevant sector (FNMA, GNMAI, etc.) at time t. Then, its 45-day forward settling price is derived as the linearly interpolated price:

$$p_{5.0}^{45}(t) = w_1 * p_{5.0}^{T1}(t) + w_2 * p_{5.0}^{T2}(t)$$

where $w_1$ and $w_2$ are the time interpolation weights derived from the dates corresponding to t, T1 and T2. Once the 45-day prices are obtained, the current coupon rate can be computed and, knowing that, interpolation across yield and computation of the constant in-the-moneyness prices can be done.

Assume, for example, that the current coupon is 5.3. Then the 5.0 coupon mortgage has a relative coupon of −30 basis points (bp). Similarly, the 4.5 coupon mortgage has a relative coupon of −80 bp. Linear interpolation can be done across yield and the 45-day price of a mortgage passthru that has a relative coupon of −50, or one that is 50-bp out of the money can be computed. Conversely, the price of each coupon can be expressed as a weighted average of the synthetic fixed relative-coupon mortgages, those at intervals of 50 bps. Thus, the 45-day price of the 5.0 coupon mortgage is expressed as a linear combination of the prices (by "prices" it is meant 45-day prices hereinafter) of the synthetic −50 bp passthru and the current coupon passthru. Because the durations of these constant relative-coupon passthrus are assumed as being constant, their change in price can be expressed as duration times the change in the yield curve. Here the duration is expressed as $$\frac{dp}{dy}$$

or dollar duration and the change in yield curve $\Delta y$ is expressed in terms of the change in yield of a single benchmark treasury or swap. For the entire coupon stack, then, the following applies:

$$\Delta \underline{p}(t) = \Delta y(t) * [W](t) * \underline{d}$$

where $\Delta \underline{p}(t)$ is the n-dimensional vector of changes in 45-day prices across the coupon stack, $\Delta y(t)$ is the scalar change in the benchmark rate, [W] is the n×m matrix of relative coupon weights, and $\underline{d}$ is the m-dimensional vector of constant relative coupon durations. These unknown durations are estimated empirically using daily closing data.

To solve for the unknown durations $\underline{d}$, the calculations above are performed for each trading day based on closing prices and benchmark rates. Then, for a given time horizon of k-days, the following linear system is assembled:

$$\begin{pmatrix} \frac{\Delta \underline{p}(t-k)}{p(t-k)} \\ \vdots \\ \frac{\Delta \underline{p}(t)}{p(t)} \end{pmatrix} = \begin{pmatrix} \Delta y(t-k)[w](t-k) \\ \vdots \\ \Delta y(t)[w](t) \end{pmatrix} \underline{d}$$

where the vector of price changes on the left is of dimension kn and the matrix of relative coupon weights and rate changes is of dimension kn×m. The vector of durations $\underline{d}$, assumed to be constant during the k-day horizon, is of dimension m as before but are expressed now in terms of modified durations. The linear system may be expressed more simply as:

$$[\Delta \underline{p}]^k = [\tilde{W}]^k \underline{d}$$

This is a rectangular system of linear equations and is underconstrained. A least-squares approach may be used to solve it by employing robust numerical methods; for example, by doing a singular value decomposition (SVD) of the matrix $[\tilde{W}]^k$. The result is the empirical modified duration profile by relative coupon of mortgage passthrus of a given sector (FNMA, GNMA, etc.) for a particular time horizon k and using a specified benchmark rate (10-year Treasury, 5-year Swap, etc.).

The linear system is assembled, for example, once daily, and estimation is done for a choice of multiple time horizons k and benchmark rates. Here, k may be 90, 60 or 30 days and the benchmark rates may be either 10-year treasury or swap rates or 5-year treasury or swap rates. Once the empirical durations are obtained, the real-time dollar durations of mortgage passthrus are computed using the same method as outlined hereinabove, except that now the current coupon yield $r_{cc}$ is computed in real-time at step 14. Once the current coupon yield is known, the real-time relative coupons of the various passthrus in the coupon stack can be computed. Knowing these, the relative coupon weights [W](t̂) at time t̂ during the trading day can be computed at step 16. At step 20, the real-time empirical dollar durations $$\frac{dp}{dy(\hat{t})}$$

are obtained as the product of the real-time 45-day prices, the weighting matrix [W](t̂) and the empirical durations $\underline{d}$. For instance, the real-time empirical dollar duration of the 5.0 coupon mortgage is obtained as:

$$\frac{dp}{dy_{5.0}}(\hat{t}) = [\underline{w}_{5.0}(\hat{t})\underline{d}]p_{5.0}^{45}(\hat{t})$$

where $\underline{w}_{5.0}(\hat{t})$ is the row of [W](t̂) corresponding to the 5.0 coupon mortgage. Once the real-time dollar duration of any given mortgage passthru is obtained, its real-time hedge-ratios are derived at step 22 using the real-time dollar durations of the hedge instruments, such as the 10-year treasury. At step 24, the hedge positions are output such that users (e.g., traders) are able to rebalance their portfolios at will even if the mortgage market moves to such an extent that the inherent optionality, and thus the durations, of individual mortgage passthru coupons changes significantly during the trading day.

Figure 2:
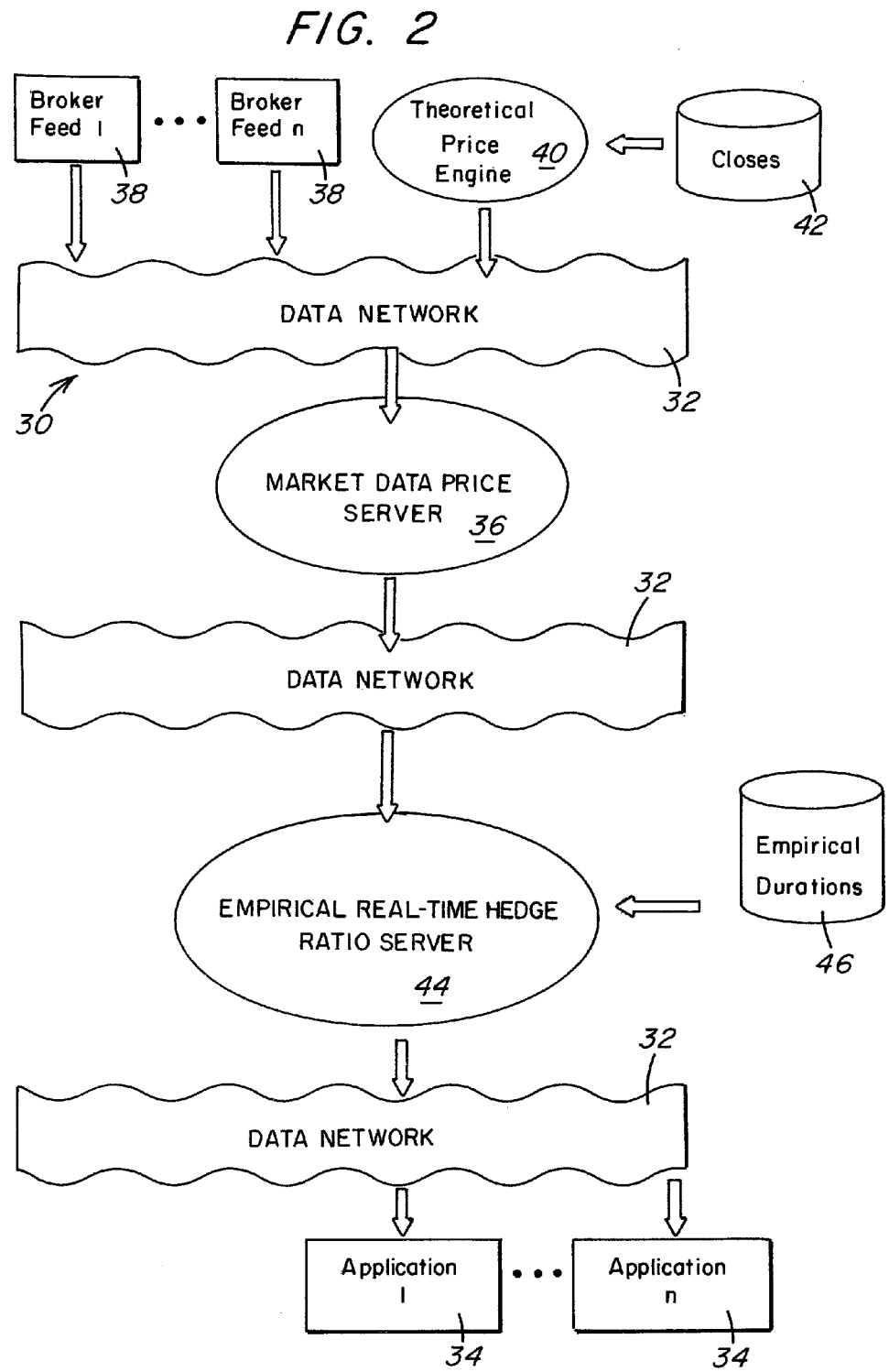
FIG. 2 illustrates an embodiment of a system for determining a hedge position for a security.

FIG. 2 illustrates an embodiment of a system 30 for determining a hedge position for a security. The system 30 includes a real-time data transport network 32 that is, for example, fault-tolerant and reconfigurable. The data network 32 provides in-memory caching of real-time data, and is capable of connecting to multiple sources and sinks (users) of data. In various embodiments, the data network 32 is capable of filtering out data coming from sources that are of no interest to a particular user. In various embodiments, a user is able to either queue up or compress the data feeds, depending on their usage. In various embodiments, the data network 32 uses direct TCP/IP connections to both source and sink, and is configured in cascading levels, from top-level sources to routing nodes, hub and spoke nodes, all organized in terms of fault-tolerant dual-redundant pairs of servers. The data network 32 may provide Application Programming Interfaces (APIs) for client applications 34 in a variety of languages, as well as a comprehensive suite of monitoring and administration tools for configuration management and data querying.

The system 30 includes a market data price server 36, which derives optimal mid-prices of mortgage passthru coupons across agency sectors and settlement months. The final prices (bid, ask, and mid) are derived from two sources: a set of live broker price feeds 38 delivered across the data network 32, and a theoretical price engine 40 that computes the theoretically implied prices of mortgages based on the movements in the yield curve and a knowledge of durations, either model-based or derived empirically. In various embodiments, the market data price server 36 incorporates numerous controls that allow users (e.g., traders) close control over the entire derivation process, thus helping them step around pathological market conditions where a price picture is not readily available.

In various embodiments, the theoretical price engine 40 uses computed overnight partial durations of individual passthrus, their closing prices 42, and using live feeds of treasury, swap and agency curves delivered over the data network 32, computes the implied prices. At all levels of this computation, the users retain control over the various choices of duration, curves, etc.

The market data price server 36 computes the best bid/ask broker prices from a variety of broker price feeds 38, as well as the output of the theoretical price engine 40, all delivered in real-time via the data network 32. The market data price server 36 subscribes to these feeds and computes an optimal and complete price picture from a combination of broker prices on coupons, inter-coupon and inter-sector swap prices and roll prices.

An empirical real-time hedge ratio server 44 subscribes to live price feeds from the market data price server 36, computes the real-time current coupon yield $r_{cc}$, and thus computes the relative coupon weights and 45-day prices for each of the passthrus in the coupon stack. Once these are available, using the relative coupon empirical durations 46 estimated overnight, the real-time dollar durations and thus the real-time hedge ratios are computed using the methods described hereinabove. The hedge ratios are then published via the data network 32 to downstream applications 34 that manage the trading book.

Embodiments of the systems and methods described herein can be used for real-time hedging of large, heterogeneous mortgage passthru positions. Various embodiments include the following: a computational system that derives optimal mid prices of mortgage passthrus in real-time based on multiple, live broker feeds and implied theoretical prices; a scaleable, fault-tolerant network transportation infrastructure for the live publishing and subscription of real-time mortgage data; robust algorithms that compute empirically observed mortgage durations based on a choice of benchmark rates and time horizons; and real-time algorithms that dynamically derive mortgage hedge ratios.

Although various embodiments of the systems and methods described herein have been described in connection with mortgage passthru securities, it can be understood that the systems and methods may be used for other types of securities.

The term "computer-readable medium" is defined herein as understood by those skilled in the art. It can be appreciated, for example, that method steps described herein may be performed, in certain embodiments, using instructions stored on a computer-readable medium or media that direct a computer system to perform the method steps. A computer-readable medium can include, for example and without limitation, memory devices such as diskettes, compact discs of both read-only and writeable varieties, digital versatile discs (DVD), optical disk drives, and hard disk drives. A computer-readable medium can also include memory storage that can be physical, virtual, permanent, temporary, semi-permanent and/or semi-temporary. A computer-readable medium can further include one or more data signals transmitted on one or more carrier waves.

As used herein, a "computer" or "computer system" may be, for example and without limitation, either alone or in combination, a personal computer (PC), server-based computer, main frame, microcomputer, minicomputer, laptop, personal data assistant (PDA), cellular phone, pager, processor, including wireless and/or wireline varieties thereof, and/or any other computerized device capable of configuration for processing data for either standalone application or over a networked medium or media. Computers and computer systems disclosed herein can include memory for storing certain software applications used in obtaining, processing, storing and/or communicating data. It can be appreciated that such memory can be internal or external, remote or local, with respect to its operatively associated computer or computer system. The memory can also include any means for storing software, including a hard disk, an optical disk, floppy disk, ROM (read only memory), RAM (random access memory), PROM (programmable ROM), EEPROM (extended erasable PROM), and other suitable computer-readable media.

It is to be understood that the figures and descriptions of embodiments of the present invention have been simplified to illustrate elements that are relevant for a clear understanding of the present invention, while eliminating, for purposes of clarity, other elements. Those of ordinary skill in the art will recognize, however, that these and other elements may be desirable for practice of various aspects of the present embodiments. However, because such elements are well known in the art, and because they do not facilitate a better understanding of the present invention, a discussion of such elements is not provided herein. It can be appreciated that, in some embodiments of the present methods and systems disclosed herein, a single component can be replaced by multiple components, and multiple components replaced by a single component, to perform a given function or functions. Except where such substitution would not be operative to practice the present methods and systems, such substitution is within the scope of the present invention. Examples presented herein, including operational examples, are intended to illustrate potential implementations of the present method and system embodiments. It can be appreciated that such examples are intended primarily for purposes of illustration. No particular aspect or aspects of the example method, product, computer-readable media, and/or system embodiments described herein are intended to limit the scope of the present invention.

It should be appreciated that figures presented herein are intended for illustrative purposes and are not intended as construction drawings. Omitted details and modifications or alternative embodiments are within the purview of persons of ordinary skill in the art. Furthermore, whereas particular embodiments of the invention have been described herein for the purpose of illustrating the invention and not for the purpose of limiting the same, it will be appreciated by those of ordinary skill in the art that numerous variations of the details, materials and arrangement of parts/elements/steps/functions may be made within the principle and scope of the invention without departing from the invention as described in the appended claims.

What is claimed is:

1. A computer assisted method of computing hedge ratios for one or more hedge instruments to hedge a portfolio of mortgage-backed securities belonging to a mortgage sector, the mortgage sector having multiple different coupons in a coupon stack, the method comprising:
   calculating, by a computer system, a vector of relative coupon durations for the coupons in the coupon stack based on a system of equations that relates a vector of price changes across the coupons in the coupon stack, a change in a benchmark interest rate, a matrix of relative coupon weights, and the vector of relative coupon durations;
   calculating, by the computer system, real-time relative coupons for the coupon stack based on a real-time current coupon yield for the mortgage sector;
   calculating, by the computer system, real-time relative coupon weights for the coupons based on the calculated real-time relative coupons;
   calculating, by the computer system, real-time dollar durations for the coupons in the coupon stack based on a product of the real-time relative coupon weights and the vector of relative coupon durations; and
   calculating, by the computer system, the hedge ratios for the one or more hedge instruments based on the real-time dollar durations for the coupons,
   wherein the computer system comprises one or more networked computer devices, each of the one or more computer devices comprising a processor and a memory.

2. The method of claim 1, wherein the system of equations comprises a linear system $[\Delta\hat{p}]^k = [\tilde{W}]^k \hat{d}$, where $\Delta\hat{p}$ is the vector of price changes across the coupons in the coupon stack, $[\tilde{W}]^k$ is the matrix of relative coupon weights multiplied by a change in a benchmark rate, k is a time horizon, and $\hat{d}$ is the vector of relative coupon durations.

3. The method of claim 1, wherein the one or more hedge instruments comprise treasury instruments.

4. The method of claim 1, further comprising rebalancing the portfolio based on the calculated hedge ratios.

5. The method of claim 1, wherein:
   calculating the vector of relative coupon durations comprises calculating the vector of relative coupon durations once daily; and
   calculating the real-time dollar durations comprise calculating the real-time dollar durations in real-time based on the vector of relative coupon durations.

6. The method of claim 5, further comprising calculating the vector of price changes prior to calculating the vector of relative coupon durations.

7. The method of claim 6, wherein the matrix of relative coupon weights is calculated using daily changes in the benchmark rate and relative coupon weights.

8. The method of claim 7, wherein calculating the vector of relative coupon durations comprises employing singular value decomposition of the matrix of relative coupon weight to calculate the vector of relative coupon durations.

9. The computer system of claim 7, wherein calculating the vector of relative coupon durations comprises employing singular value decomposition of the matrix of relative coupon weight to calculate the vector of relative coupon durations.

10. A computer readable medium having stored thereon instructions which, when executed by a processor, cause the processor to:
   calculate a vector of relative coupon durations for the coupons in the coupon stack based on a system of equations that relates a vector of price changes across the coupons in the coupon stack, the change in a benchmark interest rate, a matrix of relative coupon weights, and the vector of relative coupon durations;
   calculate real-time relative coupons for the coupon stack based on a real-time current coupon yield for the mortgage sector;
   calculate real-time relative coupon weights for the coupons based on the calculated real-time relative coupons;
   calculate real-time dollar durations for the coupons in the coupon stack based on a product of the real-time relative coupon weights and the vector of relative coupon durations; and
   calculate the hedge ratios for the one or more hedge instruments based on the real-time dollar durations for the coupons.

11. A computer system for computing hedge ratios for one or more hedge instruments to hedge a portfolio of mortgage-backed securities belonging to a mortgage sector, the mortgage sector having multiple different coupons in a coupon stack, the computer system comprising:

one or more computer devices, each of the one or more computer devices comprising a processor and a memory, wherein the one or more computer devices are programmed to compute the hedge ratios by:
- calculating a vector of relative coupon durations for the coupons in the coupon stack based on a system of equations that relates a vector of price changes across the coupons in the coupon stack, the change in a benchmark interest rate, a matrix of relative coupon weights, and the vector of relative coupon durations;
- calculating real-time relative coupons for the coupon stack based on a real-time current coupon yield for the mortgage sector;
- calculating real-time relative coupon weights for the coupons based on the calculated real-time relative coupons;
- calculating real-time dollar durations for the coupons in the coupon stack based on a product of the real-time relative coupon weights and the vector of relative coupon durations; and
- calculating the hedge ratios for the one or more hedge instruments based on the real-time dollar durations for the coupons.

12. The computer system of claim 11, wherein the system of equations comprises a linear system $[\Delta \hat{p}]^k = [\tilde{W}]^k \hat{d}$, where $\Delta \hat{p}$ is the vector of price changes across the coupons in the coupon stack, $[\tilde{W}]^k$ is the matrix of relative coupon weights multiplied by a change in a benchmark rate, k is a time horizon, and $\hat{d}$ is the vector of relative coupon durations.

13. The computer system of claim 11, wherein the one or more hedge instruments comprise treasury instruments.

14. The computer system of claim 11, further comprising rebalancing the portfolio based on the calculated hedge ratios.

15. The computer system of claim 11, wherein:
- calculating the vector of relative coupon durations comprises calculating the vector of relative coupon durations once daily; and
- calculating the real-time dollar durations comprise calculating the real-time dollar durations in real-time based on the vector of relative coupon durations.

16. The computer system of claim 15, the vector of price changes is calculated prior to calculating the vector of relative coupon durations.

17. The computer system of claim 16, wherein the matrix of relative coupon weights is calculated using daily changes in the benchmark rate and relative coupon weights.

\* \* \* \* \*